United States Patent [19]

Swor et al.

[11] Patent Number: 5,494,955
[45] Date of Patent: Feb. 27, 1996

[54] USE OF SILANE COUPLING AGENT WITH CARBON BLACK TO ENHANCE THE BALANCE OF REINFORCEMENT PROPERTIES OF RUBBER COMPOUNDS

[75] Inventors: Ronald A. Swor; Rodney L. Taylor, both of Monroe, La.

[73] Assignee: Columbian Chemicals Company, Atlanta, Ga.

[21] Appl. No.: 225,010

[22] Filed: Apr. 8, 1994

[51] Int. Cl.⁶ .................................................. C08K 3/04
[52] U.S. Cl. .................... 524/496; 524/495; 524/261; 524/262; 524/263; 524/264; 524/265
[58] Field of Search ................................ 524/495, 496, 524/261, 262, 263, 264, 265

[56] References Cited

U.S. PATENT DOCUMENTS

| | | | |
|---|---|---|---|
| 3,873,489 | 3/1975 | Thurn et al. | 260/33.6 |
| 3,997,356 | 12/1976 | Thurn et al. | 106/288 |
| 4,076,550 | 2/1978 | Thurn et al. | 106/288 |
| 4,128,438 | 12/1978 | Wolff et al. | 106/307 |
| 4,463,125 | 7/1984 | Stuchal | 524/566 |
| 4,518,376 | 5/1985 | Mashimo et al. | 474/261 |
| 4,519,430 | 5/1985 | Ahmad et al. | 152/209 |
| 4,820,751 | 4/1989 | Takeshita et al. | 523/215 |
| 5,006,603 | 4/1991 | Takaki et al. | 525/105 |
| 5,153,248 | 10/1992 | Muse et al. | 524/105 |
| 5,159,009 | 10/1992 | Wolf et al. | 524/495 |
| 5,227,425 | 7/1993 | Rauline | 524/493 |

*Primary Examiner*—Paul R. Michl
*Assistant Examiner*—Edward J. Cain

[57] ABSTRACT

A method of improving balance of properties, such as increased reinforcement and reduced rolling resistance of a rubber compound, comprising mixing the rubber compound with a carbon black and a silane coupling agent for a period of between about 10 seconds and 20 minutes at a temperature of between about 160° C. and 180° C. such as a styrene butadiene rubber compound, is disclosed. The method involves mixing the rubber compound "in situ" with a carbon black and Bis(3-triethoxysilylpropyl)-tetrasulfane at ambient temperature.

33 Claims, 3 Drawing Sheets

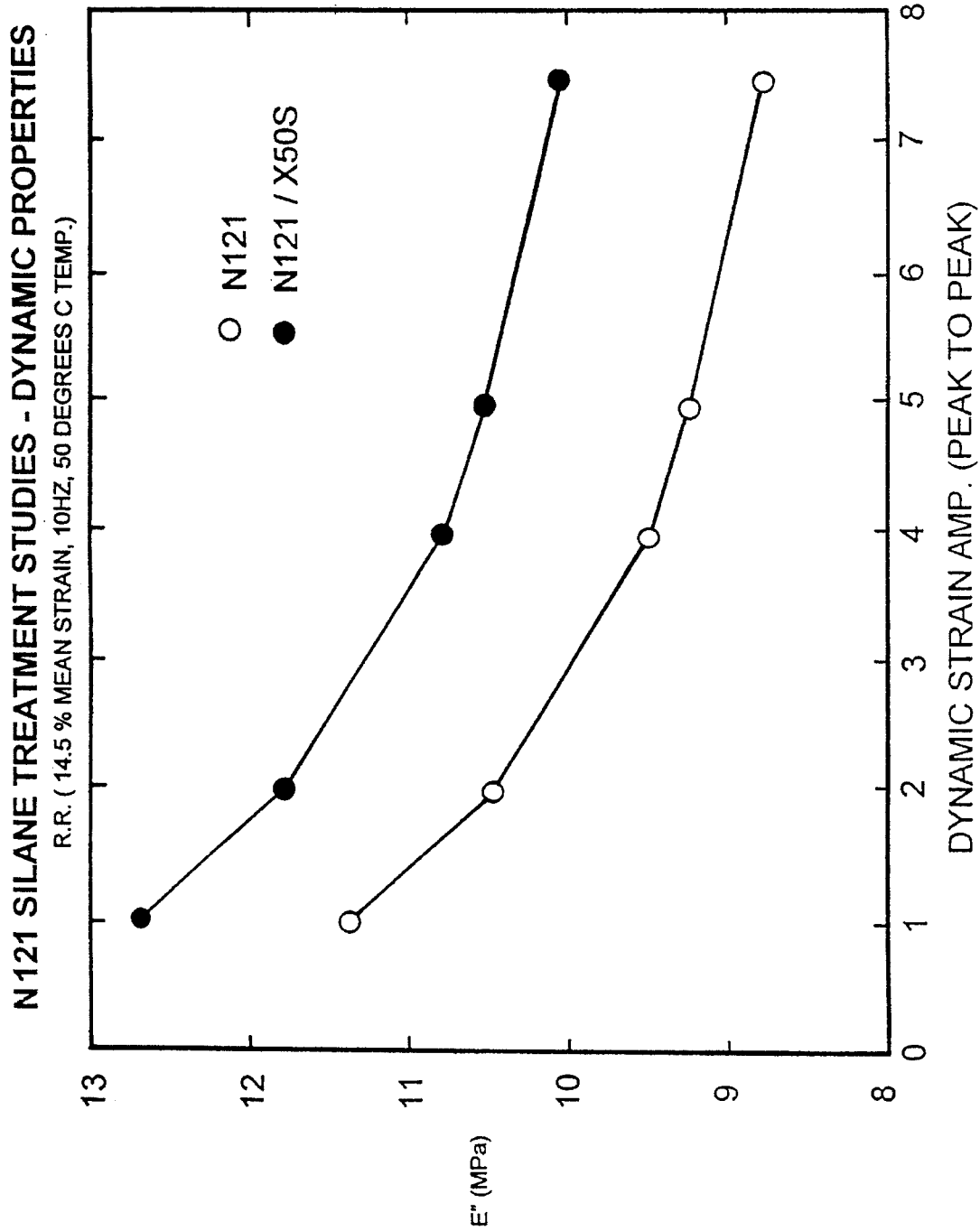

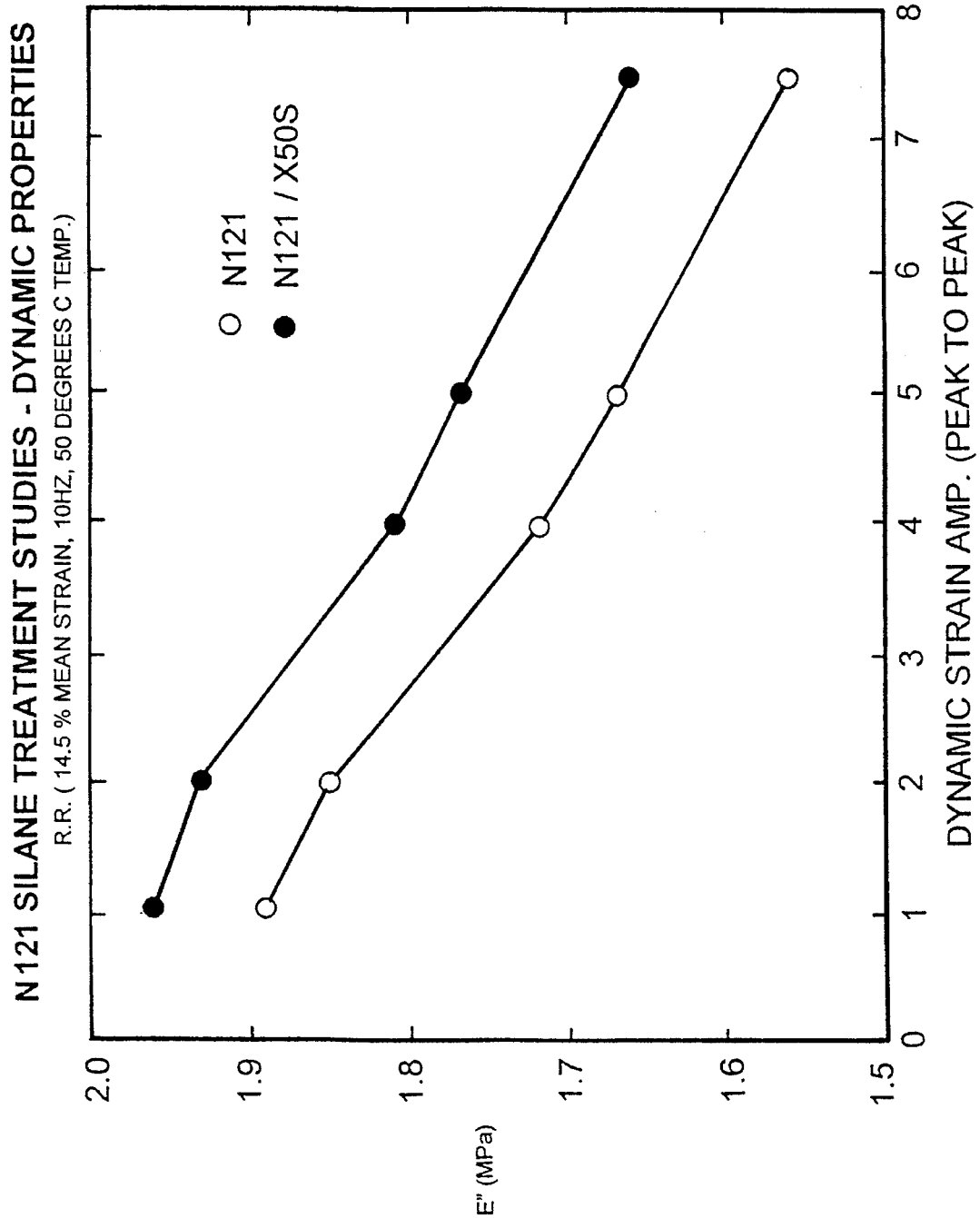

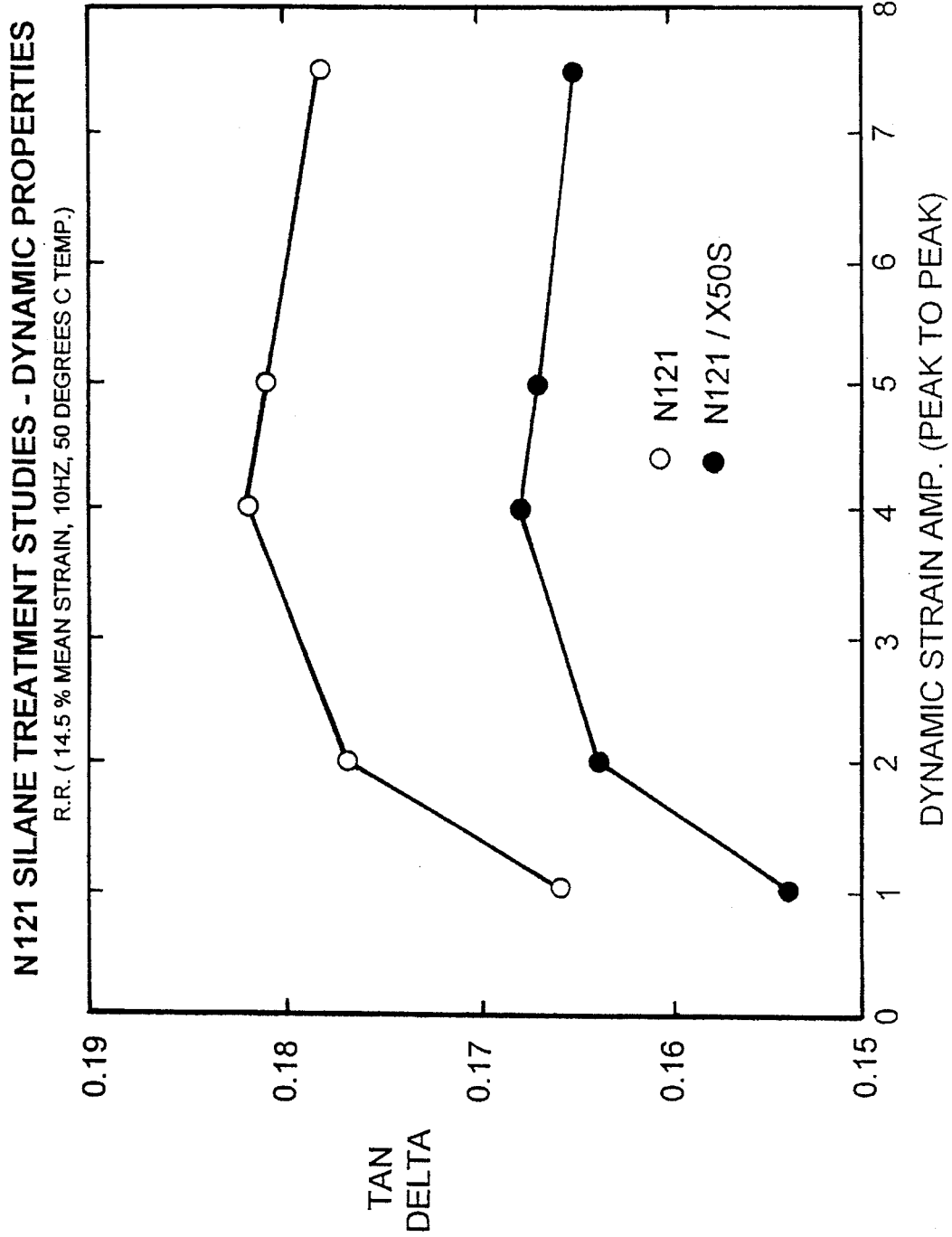

USE OF SILANE COUPLING AGENT WITH CARBON BLACK TO ENHANCE THE BALANCE OF REINFORCEMENT PROPERTIES OF RUBBER COMPOUNDS

FIELD OF THE INVENTION

This invention relates to the modification of carbon blacks and the use of these modified carbon blacks in rubber compositions.

BACKGROUND OF THE INVENTION

Much of the basic research being done today in the rubber industry is directed to defining the content of the rubber compositions which will someday comprise the perfect tire. The litmus of the various formulations developed has been a battery of tests defining the rubber compound's physical properties to determine its fitness for particular applications. One property of interest has been the comparative rolling resistance demonstrated by a tire tread containing a modified rubber compound. This property, which relates to the rubber compound's ability to withstand constant energy input at different frequencies, is of obvious practical importance: reducing the rolling resistance of a tire increases the automotive consumer's gas mileage.

On Oct. 27, 1992, U.S. Pat. No. 5,159,009, entitled "Carbon Blacks Modified with Organosilicon Compounds, Method of Their Production and Their Use in Rubber Mixtures," was issued. This patent (hereinafter referred to as the '009 patent) describes a process for preparing silane modified carbon blacks for subsequent use in reinforcing rubber compounds.

The '009 patent shows a process for bonding organosilicon compounds to carbon black, see '009 patent at col. 1 lns. 51–56, which is to be performed before mixing the reaction product with a rubber mixture, see '009 patent at col. 3 lns. 13–16. Hence, in this disclosure, the '009 process is sometimes termed a "pretreatment" process, because the carbon black is treated in a carefully prescribed manner before being compounded into a rubber mixture.

The '009 pretreatment process comprises: (a) homogeneously mixing one or more of the specified organosilicon compounds with the carbon black in a vessel; (b) heating the components for 1 to 60 minutes at 50° C. to 160° C. in the mixing vessel or another suitable tempering unit; and then (c) extracting any excess unreacted organosilicon compounds with an organic solvent. See '009 patent at col. 2 lns. 29–39.

The particulars of the '009 patent's mixing-heating-extracting process are emphasized throughout the specification. For example, the heating step is termed the "second stage" of the process, see '009 patent at col. 5 lns. 6–11, and the three-stage process shown is uniformly employed in reacting all carbon blacks and silanes used in the examples provided, see '009 patent at col. 5 lns. 12–13.

The extraction step is also emphasized in the patent. Extraction of excess unreacted organosilicon compounds is stated as necessary, because "Extractable amounts of this compound (these compounds) which exceed this amount not only do not result in any further improvement of the properties of the vulcanizate but on the contrary result in a worsening of the rubber technology properties." '009 patent at col. 2 lns. 53–58 (emphasis added). The extraction step could be omitted by using stoichiometric quantities of the organosilicon compounds; this would ensure that there was no excess requiring removal. See '009 patent at col. 2 lns. 59–68; col. 5 lns. 15–44.

The consequences of failure to adhere to the process of the '009 patent is emphasized in two examples in the patent. In Example VI, there is provided a comparison of two natural rubber compounds, both of which employed silane-modified N110 carbon blacks. The first employs an amount of silane which corresponds precisely to the bondable/stoichiometric amount; the second employs an excess of silane. The addition of the excess silane results in a deterioration in (a) tensile strength (lower), (b) modulus 300% (lower), (c) curing time (higher), and (d) delta T center (higher). See '009 patent at col. 8 lns. 13–50.

In Example VII, there is provided a comparison of two SBR (styrene-butadiene rubber) compounds employing N375 carbon black. In the first rubber composition, the carbon black is pretreated with Si69 in accord with the teachings of the invention. The second rubber composition employs a 50:50 mixture of the N375 carbon black and Si69; pretreatment of the carbon black is conspicuously absent. The non-pretreated carbon black rubber composition is shown to display a deteriorated (a) tensile strength (lower), (b) modulus 300% (lower), (c) hardness (lower), (d) dynamic elastic modulus (lower), (e) abrasive wear (higher), and (f) loss angle tan delta (higher), as well as displaying unusual rheometer cure properties. See '009 patent at col. 8 ln. 52-col. 9 ln. 18.

Thus, using the '009 process in the manufacture of rubber compounds requires careful adherence to the claimed "two-step" process: (a) pretreatment (i.e., mixing-heating-extracting) of the carbon black with the prescribed silanes; and then (b) addition of the silane-modified carbon black to the rubber compound in a mixer. In addition, the process is highly sensitive to the amount of silane added to the carbon black; the amount must be stoichiometric. Non-stoichiometric additions of silane result in suboptimal properties in the final rubber product. Left unmet is the need for a process which is not as sensitive to the amount of silane relative to the carbon black and which is faster and more cost-effective than the '009 patent's process.

SUMMARY OF THE INVENTION

The present invention provides a one-step process of producing rubber compositions, which results in a reduction in the rolling resistance of these compositions. The process is termed a one-step process because it eliminates the prior art steps of first pretreating the carbon black and then removing the excess silane before adding the carbon black to the rubber for compounding. Therefore, in accordance with the present invention, and as taught in U.S. Pat. No. 5,159,009, carbon blacks are chemically modified with one or more organosilicon compound(s) of the General Formulas

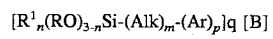

$[R^1{}_n(RO)_{3-n}Si\text{-}(Alk)_m\text{-}(Ar)_p]q$ [B]

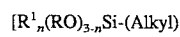

$[R^1{}_n(RO)_{3-n}Si\text{-}(Alkyl)]$ or

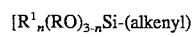

$[R^1{}_n(RO)_{3-n}Si\text{-}(alkenyl)]$ in which B represents —SCN, —SH, —Cl, —NH$_2$ (if q=1) or —S$_x$— (if q=2), R and R$^1$, which may be the same or different, represent an alkyl group containing 1 to 4 carbon atoms, the phenyl group, q represents 1 or 2 n represent 0 1 or 2,

Alk represents a bivalent straight or branched hydrocarbon group containing 1 to 6 carbon atoms, m represents 0 or 1, Ar represents a arylene group containing 6 to 12 carbon atoms, preferably 6 to 8 carbon atoms, p represents 0 or 1 provided that p and n do not simultaneously signify 0, x represents a number from 2 to 8, Alkyl represents a monovalent straight or branched unsaturated hydrocarbon group containing 1 to 20 carbon atoms, preferably 1 to 6 carbon atoms, Alkenyl represents a monovalent straight or branched unsaturated hydrocarbon group with 2 to 20 carbon atoms, preferably 2 to 6 carbon atoms, and on the surface of which blacks 0.1 to 15% by weight of one or more of the named organosilicon compounds are bonded in such a manner that they cannot be extracted with an organic solvent, especially diethyl ether. The indication of % by weight refers to the total weight of the modified black.

DETAILED DESCRIPTION OF THE PREFERRED EMBODIMENT

Experiments were conducted to assess the ability of a commercial silane coupling agent to influence the reinforcement characteristics of carbon black in tread compounds. A preferred silane coupling agent for this purpose is DeGussa's reinforcing agent "X 50-S," a mixture of Si69 and Corax N330 (HAF carbon black) in a proportion of 1:1 by weight in which the N330 carbon black is simply a carrier to render the silane into a solid form which is more easily handled and mixed.

Si69, Bis(3-triethoxysilylpropyl)-tetrasulfane, is the active ingredient of Degussa X 50-S. It is a bifunctional organosilane containing two reactive groups: (1) tetrasulfane and (2) ethoxy. It is used mainly to improve the reinforcing capability of fillers with silanol groups on their surfaces (e.g., silica, silicates, clays) by coupling the filler surface to the rubber compound. The ethoxy groups react specifically with the silanol (—Si—OH) groups on the surface of siliceous fillers to eliminate ethanol to form stable filler-Si69 intermediates. These intermediates contain the unreacted tetrasulfide groups which provide the bridge for a filler-rubber crosslink at high temperatures.

Carbon black, however, contains fewer surface OH groups and no silanol (Si—OH) groups to react as extensively as a siliceous filler. The tetrasulfane groups, in the presence of accelerators, are available to react with the double bonds in rubber to form crosslinks. This reaction is independent of the presence of sulfur (Si69 can act as a sulfur donor) but requires high temperatures.

The inventors have discovered that useful rubber compounds can be generated by treating the rubber compound and the carbon black with Si69 at Banbury mixing temperatures. A Banbury is an intensive mixer which subjects polymer mixtures to high shear rates in an enclosed chamber. The Si69 (or, the DeGussa X 50-S) is not applied as a pretreatment as per the teachings of the '009 patent but instead added "in situ" to the Banbury with the carbon black.

In the preferred embodiment of the process, the rubber of the compound to be prepared is mixed with a specified amount of carbon black and the aforementioned silane coupling agent to obtain a masterbatch. The masterbatch is then worked for a period of between about 10 seconds to 20 minutes at a temperature of between about 160° C. and 180° C. The masterbatch is then allowed to cool to a temperature less than the temperature at which vulcanization would occur upon addition of the curatives. Finally, the curatives are added to the masterbatch and mechanically worked into the cooled rubber compound mixture until homogeneity is achieved.

The following examples are illustrative of the invention and do not limit the scope of the invention as described above and claimed herebelow.

The compounds in the following examples were prepared according to standard ASTM practices (D3182 and D3183) and tested per ASTM procedures for dispersion (D2663), rheometer (D2084), stress/strain (D412), hardness (D2240), rebound (D1054), and heat buildup (D623). Dynamic property measurements were conducted in compression using an Instron dynamic tester, model 1332 under the conditions specified.

Example I

A first study compared the performance of N234-type carbon black with and without X 50-S in a solution SBR tread formulation at 80 phr carbon black loading. The work that was conducted used 4 phr of X 50-S, which is equivalent to using 2 phr Si69 because of the weight fraction of Si69 in the X 50-S. The amount of Si69 added is consistent with the recommendations of the '009 patent. The X 50-S was added as a separate material to the Banbury along with the N234 carbon black, as disclosed in greater detail below. The following table summarizes the formulations and resulting properties of the rubber compounds:

| SBR TEST FORMULATIONS | | | | |
|---|---|---|---|---|
| | N234 Without | N234 With X 50-S | | |
| | X 50-S | 80 phr | 78 phr | 75 phr |
| SBR (Duradene 753) | 120 | 120 | 120 | 120 |
| N234 | 80 | 80 | 78 | 75 |
| X 50-S | 0 | 4 | 4 | 4 |
| Aromatic Oil | 17.5 | 17.5 | 17.5 | 17.5 |
| Zinc Oxide | 2.5 | 2.5 | 2.5 | 2.5 |
| Stearic Acid | 1 | 1 | 1 | 1 |
| Antioxidant | 2 | 2 | 2 | 2 |
| Wax | 1.5 | 1.5 | 1.5 | 1.5 |
| Sulfur | 1.35 | 1.35 | 1.35 | 1.35 |
| Santocure | 1.35 | 1.35 | 1.35 | 1.35 |
| Total | 227.2 | 231.2 | 229.2 | 226.2 |
| PHYSICAL PROPERTIES IN SBR FORMULATION | | | | |
| Phr Carbon | 80 | 80 | 78 | 75 |
| Phr X 50-S | 0 | 4 | 4 | 4 |
| Rubber Properties (Cured @ 145° C.) | | | | |
| L-100 Mod., MPa | 1.85 | 2.34 | 2.10 | 1.91 |
| L-200 Mod., MPa | 4.46 | 6.87 | 5.92 | 5.14 |
| L-300 Mod., MPa | 8.82 | 13.16 | 11.65 | 10.24 |
| Tensile, MPa | 21.88 | 22.85 | 23.13 | 22.84 |
| Elongation, % | 634 | 497 | 552 | 585 |
| Dispersion Index | 97 | 96 | 95 | 95 |
| S. Hardness | 62 | 63 | 61 | 60 |
| BFG HBU, °C. | 87 | 79 | 80 | 80 |
| Zwick Reb., % | | | | |
| @ 0° C. | 16.0 | 16.1 | 16.4 | 17.5 |
| @ 100° C. | 51.2 | 54.7 | 55.3 | 54.5 |
| Rheometer Cure Properties (½° ARC @ 165° C.) | | | | |
| Max. Torque, dNm | 14.2 | 14.4 | 14.0 | 13.3 |

SBR TEST FORMULATIONS

|  | N234 Without X 50-S | N234 With X 50-S | | |
|---|---|---|---|---|
|  |  | 80 phr | 78 phr | 75 phr |
| Min. Torque, dNm | 3.6 | 4.1 | 3.8 | 3.3 |
| 0.1 Nm Rise, min. | 2.6 | 1.7 | 1.9 | 1.7 |
| 90% Net, min. | 5.4 | 6.9 | 7.1 | 9.7 |
| Dynamic Properties (In Compression at 14.5% M.S., 10 Hz, 50° C., 75 E, ptp) | | | | |
| Tan Delta | 0.261 | 0.240 | 0.236 | 0.227 |
| Relative Tan Delta, % | 100 | 92 | 90 | 87 |
| Predicted Tire Rolling Resist.* | 110.8 | 106.2 | 105.4 | 103.4 |

*Based on tire performance correlation with Tan Delta versus N220 (lower number is better). See W. M. Hess and W. K. Klamp, The Effects of Carbon Black and Other Compounding Variables on Tire Rolling Resistance and Traction, 56(2) Rubber Chem. and Tech. 390 (May–June 1983).

From the above table, it is seen that the N234 compounded with the X 50-S coupling agent developed, relative to the N234 compound without X 50-S:

a. Slightly higher modulus b. Slightly higher tensile strength c. Slightly lower elongation d. Lower heat buildup e. Equal relative rebound response at 0° C. and a significantly higher relative rebound response at 100° C.

f. Slightly higher T$_{90}$ cure time g. Significantly lower Tan Delta

Overall, the primary effect of the invention is to improve (lower) the rolling resistance of the rubber compound, as shown by the heat buildup (lower), tan Delta (lower), and rebound response (higher), relative to the control compound without the treatment with X 50-S. See W. M. Hess and W. K. Klamp, *The Effects of Carbon Black and Other Compounding Variables on Tire Rolling Resistance and Traction*, 56(2) *Rubber Chem. and Tech.* 390 (May–June 1983) (agreeing with previous research studies that tire rolling resistance is correlated with the tire tread rubber's dynamic properties, particularly the loss angle, tan Delta, and the rebound response). Furthermore, enhancement of the reinforcement properties permits reductions in carbon black loading to further reduce rolling resistance at equal modulus.

The mixing procedures employed for these studies utilized standard mixing equipment (e.g., a BR Banbury and a laboratory scale two-roll mill). The procedures served to achieve good dispersion levels for the carbon black fillers and the coupling agent when used to react the X 50-S with the carbon black in tire tread formulations.

Mixing Procedure for Carbon Black Compounds With and Without Silane Coupling Agent

|  | Time, minutes |
|---|---|

Stage I:
BR Banbury

Starting Temperature: 37.8° C.
Speed: 2 (1.93 Hz)
Fill Factor: 70%
Ram Pressure: 2.75 Bar

| Step | | Time, minutes |
|---|---|---|
| 1. | Add polymer(s) | 0 |
| 2. | Add ½carbon black, all of silane if needed, and dries | 0.5 |
| 3. | Add ½carbon black, free oil | 1.5 |
| 4. | Sweep Chute | 2.5 |
| 5. | Dump Batch (after achieving 160–180° C.) | 4.5 |
| 6. | Cool 1h, after sheeting out on mill | |

Stage II:
BR Banbury (same conditions as Stage I)

| Step | | |
|---|---|---|
| 1. | Add masterbatch and curatives | 0 |
| 2. | Dump batch (if exceed 121° C.) | 4.2 |
| 3. | Sheet out on mill to stress/strain gauge, cool | |

Unlike the Example 7 of the '009 patent, the in situ addition of X50-S with carbon black used in the examples of this invention impart rubber compound property improvements such as lower hysteresis and higher stress-strain properties.

Example II

The U.S. rolling resistance formulation is typical of tread formulations generally used by U.S. tire producers for low rolling resistance original equipment applications. This example uses a standard emulsion polymerized SBR elastomer (SBR 1500) and a solution polymerized elastomer (BR 1207) in combination with CD-2038, a very high structure carbon black characterized by a CTAB value of 128 m$^2$/g a DBP value of 173 cm$^3$/100 g and a CDBP value of 132 cm$^3$/100 g. The formulation is:

U.S. Rolling Resistance Tread Formulation

|  | phr Carbon Black | | |
|---|---|---|---|
|  | CD-2038 | CD-2038 | CD-2038 |
| SBR-1500 | 80 | 80 | 80 |
| BR 1207 | 20 | 20 | 20 |
| CD-2038 | 50 | 50 | 40 |
| HiSil 255G | 0 | 4 | 3.2 |
| X50S | | | |
| Naphthenic Oil | 10 | 10 | 10 |
| Zinc Oxide | 3 | 3 | 3 |
| Stearic Acid | 2 | 2 | 2 |
| Wax | 1.5 | 1.5 | 1.5 |
| Santoflex 13 | 2.5 | 2.5 | 2.5 |
| Sulfur | 1.5 | 1.5 | 1.5 |
| Santocure NS | 1.1 | 1.1 | 1.1 |
| DPG | | | |
| Zinc Oxide | | | |
| TOTAL | 171.6 | 175.6 | 164.8 |
| IN-RUBBER PROPERTIES | | | |
| CD-2038 | 50 | 50 | 40 |
| Oil | 10 | 10 | 10 |
| HiSil | 10 | 10 | 10 |
| X50S | 0 | 4 | 3.2 |
| Rubber Properties | | | |
| 100% Modulus, MPa | 2.63 | 3.14 | 2.22 |
| 200% Modulus, MPa | 7.03 | 9.27 | 5.94 |
| 300% Modulus, MPa | 12.45 | 16.90 | 11.13 |

-continued

U.S. Rolling Resistance Tread Formulation phr
Carbon Black

|  | CD-2038 | CD-2038 | CD-2038 |
|---|---|---|---|
| Tensile, MPa | 23.08 | 20.37 | 21.64 |
| Elongation, % | 514 | 348 | 495 |
| Shore Hardness | 64 | 65 | 59 |
| DI | 98 | 88 | 94 |
| Rheometer Cure Properties (165° C., 0.5 Arc) | | | |
| MH, dNm | 15.9 | 17.0 | 14.0 |
| ML, dNm | 2.9 | 5.9 | 3.0 |
| 0.1 Nm Rise, min. | 2.5 | 2.2 | 3.0 |
| 90% Net, min. | 9.6 | 8.8 | 9.3 |
| Dynamic Properties (Rolling Resistance Conditions, 50° C.) | | | |
| E', MPa | 9.85 | 10.75 | 8.02 |
| E", MPa | 1.80 | 1.83 | 1.17 |
| Tan Delta | 0.18 | 0.170 | 0.146 |
| Relative Tan Delta, % | 132 | 123 | 106 |
| Predicted Rolling Resistance | 93.7 | 91.2 | 86.0 |

Note that, although the addition of X 50-S reduced the elongation levels of the CD-2038, the modulus, hardness, and particularly the loss angle tan delta were all improved.

Example III

In a third study, also directed to the tread formulation (80/20 SBR/BR) in Example II, N121 was compounded to a 50 phr loading with and without 4 phr X 50-S. This study supported the previous conclusion that benefits in (i.e., the reduction of) rolling resistance via the reduction of the loss angle tan delta can be obtained via the addition of X 50-S during mixing, contrary to the teaching of the '009 patent. The formulations and results of this study are summarized in the table below:

| SILANE TREATMENT STUDY OF N121 | | | | | | |
|---|---|---|---|---|---|---|
| ID | A-1 | A-2 | | B-1 | B-2 | |
| ADDITIVE | NONE | NONE | AVERAGE | X 50-S | X 50-S | AVERAGE |
| RHEOMETER CURE PROPERTIES (329° F. ½° ARC.) | | | | | | |
| MAX, TORQUE, dNm | 13.1 | 13.5 | 13.3 | 14.5 | 14.4 | 14.5 |
| MIN. TORQUE, dNm | 2.0 | 2.0 | 2.0 | 3.6 | 3.4 | 3.5 |
| NET TORQUE, dNm | 11.1 | 11.5 | 11.3 | 10.9 | 10.9 | 10.9 |
| 0.1 Nm Rise, min. | 2.0 | 2.1 | 2.1 | 1.5 | 1.6 | 1.6 |
| 90% NET, min. | 7.9 | 8.2 | 8.1 | 7.7 | 7.6 | 7.7 |
| STRESS/STRAIN PROPERTIES (3½93° F.) | | | | | | |
| L-100, MPa | 1.83 | 1.88 | 1.86 | 2.32 | 2.26 | 2.29 |
| L-200, MPa | 4.52 | 4.67 | 4.60 | 6.89 | 6.77 | 6.93 |
| L-300, MPa | 8.98 | 9.24 | 9.11 | 13.48 | 13.36 | 13.42 |
| TENSILE, MPa | 20.88 | 20.85 | 20.87 | 20.15 | 21.08 | 20.62 |
| ELONGATION, % | 545 | 536 | 541 | 406 | 422 | 414 |
| Dispersion Index, % | 95.5 | 94.9 | 95.2 | 97.1 | 96.6 | 96.9 |
| SHORE HARDNESS | 59 | 59 | 59 | 59 | 61 | 60 |
| DYNAMIC PROPERTIES (1% DSA, 10 Hz, 50° C. & 14.5% MEAN STRAIN) | | | | | | |
| E', MPa | 11.31 | 11.42 | 11.37 | 13.04 | 12.31 | 12.68 |
| E", MPa | 1.90 | 1.88 | 1.89 | 2.04 | 1.87 | 1.96 |
| Tan Delta | 0.168 | 0.164 | 0.177 | 0.156 | 0.152 | 0.154 |
| DYNAMIC PROPERTIES (2% DSA, 10 Hz, 50° C. & 14.5% MEAN STRAIN) | | | | | | |
| E', MPa | 0.42 | 10.51 | 10.47 | 12.08 | 11.47 | 11.78 |
| E", MPa | 1.86 | 1.84 | 1.89 | 2.01 | 1.85 | 1.93 |
| Tan Delta | 0.178 | 0.175 | 0.177 | 0.167 | 0.161 | 0.164 |
| DYNAMIC PROPERTIES (4% DSA, 10 Hz, 50° C. & 14.5% MEAN STRAIN) | | | | | | |
| E', MPa | 9.44 | 9.35 | 9.50 | 11.02 | 10.55 | 10.79 |
| E", MPa | 1.73 | 1.71 | 1.72 | 1.88 | 1.74 | 1.81 |
| Tan Delta | 0.183 | 0.180 | 0.182 | 0.171 | 0.165 | 0.168 |
| DYNAMIC PROPERTIES (5% DSA, 10 Hz. 50° C. & 14.5% MEAN STRAIN) | | | | | | |
| E', MPa | 9.19 | 9.30 | 9.25 | 10.74 | 10.31 | 10.53 |
| E", MPa | 1.68 | 1.66 | 1.67 | 1.83 | 1.70 | 1.77 |
| Tan Delta | 0.183 | 0.179 | 0.181 | 0.170 | 0.165 | 0.167 |
| DYNAMIC PROPERTIES (7.5% DSA, 10 Hz, 50° C. & 14.5% MEAN STRAIN) | | | | | | |
| E'MPa | 8.72 | 8.83 | 8.78 | 10.24 | 9.87 | 10.06 |
| E", MPa | 1.57 | 1.55 | 1.56 | 1.71 | 1.60 | 1.66 |
| Tan Delta | 0.180 | 0.175 | 0.178 | 0.167 | 0.162 | 0.165 |

The average data for each set of compounds of the dynamic properties are plotted in FIGS. 1–3 to graphically demonstrate the significant advantages of the present invention.

This third study indicates that N121 compounded with X50-S provides, relative to a control rubber formulated without the X50-S:

(a) slightly higher rheometer MH and comparable $T_{90}$ levels;

(b) higher modulus;

(c) equivalent tensile strength;

(d) lower elongation;

(e) comparable hardness;

(f) higher E' and E" at all strain amplitudes; and (g) improved loss angle tan delta (lower) at all strain amplitudes.

This testing also confirms that N121 compounded with X50-S as disclosed, and contrary to the teaching of the '009 patent, provides important improvements in reinforcement and hysteresis.

The rubber compounds for which the invention is effective include both natural rubber compounds and synthetic rubber compounds, such as butadiene and styrene-butadiene rubber compounds, and their derivatives. While the work cited involved SBR and BR elastomers, in the system as we understand it, similar benefit should be obtained in any elastomer system amenable to sulfur-based curing mechanisms.

In the case of styrene-butadiene rubber compounds, rubber compounds having a styrene content of between about 10% and 70% and a butadiene content of between about 90% and 30% have been found to be effective. Generally, amounts of the carbon black ranging from about 10 to 250 parts by weight can be used for each 100 parts by weight of rubber compound in order to impart a significant degree of reinforcement thereto. It is, however, preferred to use from about 30 to 120 parts by weight carbon black per 100 parts by weight of rubber compound.

Preferred carbon blacks for use in the invention are those having a specific surface area, as measured by the nitrogen surface area method (N2SA), of between 5 and 350 m2/g. Useful carbon blacks, as designated according to the ASTM Recommended Practice D1765 Standard Classification System for Carbon Blacks Used in Rubber Products, would therefore include, but would not be limited to, N121 and N234. Additional carbon blacks, such as CD-2038, have also been identified for use in the invention.

What is claimed is:

1. A process of improving the balance of properties, including the method of increasing reinforcement and reducing rolling resistance of a rubber compound, comprising mixing the rubber compound with a filler consisting essentially of a carbon black and a silane coupling agent prior to the addition of curing agents for a period of between about 10 seconds and 20 minutes at a temperature of between about 160° C. and about 180° C.

2. The process of claim 1 wherein the silane coupling agent comprises Bis(3-triethoxysilylpropyl)-tetrasulfane.

3. The process of claim 1, wherein the silane coupling agent is present in an amount of between two and five percent of the weight of carbon black for each one hundred m²/g of surface area of carbon black.

4. The process of claim 1 wherein the silane coupling agent is selected from the group consisting of

[R¹$_n$(RO)$_{3-n}$Si-(Alk)$_m$-(Ar)$_p$]q [B]

[R¹$_n$(RO)$_{3-n}$Si-(Alkyl)

or

[R¹$_n$(RO)$_{3-n}$Si-(Alkenyl)

in which B represents —SCN, —SH, —Cl, —NH₂ (if q=1) or —Sx— (if q=2),

R and R¹, which may be the same or different, represent an alkyl group containing 1 to 4 carbon atoms, the phenyl group, q represents 1 or 2 n represent 0 1 or 2,

Alk represents a bivalent straight or branched hydrocarbon group containing 1 to 6 carbon atoms, m represents 0 or 1, Ar represents a arylene group containing 6 to 12 carbon atoms, p represents 0 or 1 provided that p and n do not simultaneously signify 0, x represents a number from 2 to 8, Alkyl represents a monovalent straight or branched unsaturated hydrocarbon group containing 1 to 20 carbon atoms, preferably 1 to 6 carbon atoms, Alkenyl represents a monovalent straight or branched unsaturated hydrocarbon group containing 2 to 20 carbon atoms, and on the surface of which blacks 0.1 to 15% by weight of one or more of the named organosilicon compounds are bonded in such a manner that they cannot be extracted with organic solvents.

5. The process of claim 4 wherein the silane coupling agent is present in an amount of about 2 to 4 parts per hundred parts carbon black.

6. The process of claim 1 wherein the rubber compound is selected from the group consisting of: natural rubber compounds; synthetic rubber compounds; styrene-butadiene rubber compounds; and butadiene rubber compounds, or any elastomer system amenable to sulfur-based curing mechanisms.

7. The process of claim 1 wherein the rubber compound is a styrene-butadiene rubber compound having a styrene content of between about 10% and 70% and a butadiene content of between about 90% and 30%.

8. The process of claim 1 wherein the carbon black is selected from the group according to ASTM Recommended Practice D1765 Standard Classification System for Carbon Blacks Used in Rubber Products.

9. The process of claim 1 wherein the carbon black may be selected from the group consisting of CD-2038.

10. The process of claim 8 wherein the carbon black is present in an amount of between about 10 to 250 parts per hundred parts rubber compound.

11. The process of claim 1 wherein the carbon black has a specific surface area, as measured by the nitrogen surface area method (N₂SA), of between 5 and 350 m²/g.

12. The process of claim 1 wherein the mixing is accomplished via a high-shear-rate mixer.

13. A process of improving the balance of properties, including a method of reducing the rolling resistance of a rubber compound comprising:

(a) mixing the rubber compound with a specified amount of a filler consisting essentially of a carbon black and a silane coupling agent to obtain a masterbatch;

(b) mechanically working the masterbatch for a period of between about 10 seconds to 20 minutes at a temperature of between about 160° C. and 180° C.;

(c) allowing the masterbatch to cool to a temperature less than the temperature at which vulcanization would occur upon addition of curatives to the masterbatch; and (d) mixing the cooled mixture with a predetermined curative and mechanically working the masterbatched mixture until homogeneity is achieved.

14. The process of claim 13 wherein the silane coupling agent comprises Bis(3-triethoxysilylpropyl)-tetrasulfane.

15. The process of claim 14 wherein the silane coupling agent is present in amount of between two and five percent of the weight of carbon black for each one hundred m²/g of surface area of carbon black.

16. The process of claim 13 wherein the silane coupling agent is selected from the group consisting of:

$[R^1{}_n(RO)_{3-n}Si\text{-}(Alk)_m\text{-}(Ar)_p]q$ [B]

$[R^1{}_n(RO)_{3-n}Si\text{-}(Alkyl)]$ or $[R^1{}_n(RO)_{3-n}Si\text{-}(Alkenyl)]$ in which B represents —SCN, —SH, —Cl, —NH₂ (if q=1) or —Sx— (if q=2), R and R¹, which may be the same or different, represent an alkyl group containing 1 to 4 carbon atoms, the phenyl group, q represents 1 or 2 n represent 0 1 or 2,

Alk represents a bivalent straight or branched hydrocarbon group containing 1 to 6 carbon atoms, m represents 0 or 1, Ar represents a arylene group containing 6 to 12 carbon atoms, p represents 0 or 1 provided that p and n do not simultaneously signify 0, x represents a number from 2 to 8, Alkyl represents a monovalent straight or branched unsaturated hydrocarbon group containing 1 to 20 carbon atoms, Alkenyl represents a monovalent straight or branched unsaturated hydrocarbon group containing 2 to 20 carbon atoms, and on the surface of which blacks 0.1 to 15% by weight of one or more of the named organosilicon compounds are bonded in such a manner that they cannot be extracted with organic solvents.

17. The process of claim 16 wherein the silane coupling agent is present in an amount of about 2 to 4 parts per hundred parts rubber compound.

18. The process of claim 13 wherein the rubber compound is selected from the group consisting of: natural rubber compounds; synthetic rubber compounds; styrene-butadiene rubber compounds; and butadiene rubber compounds.

19. The process of claim 13 wherein the rubber compound is a styrene-butadiene rubber compound having a styrene content of between about 10% and 70% and a butadiene content of between about 90% and 30%.

20. The process of claim 13 wherein the carbon black is selected from the group according to ASTM Recommended Practice D1765 Standard Classification System for Carbon Blacks Used in Rubber Products.

21. The process of claim 20 wherein the carbon black is present in an amount of between about 10 and 250 parts per hundred parts rubber compound.

22. The process of claim 13 wherein the carbon black has a specific surface area, as measured by the nitrogen surface area method (N₂SA), of between 5 and 350 m²/g.

23. The process of claim 13 wherein the mixing is accomplished via a high-shear-rate internal mixer.

24. A method of reducing the rolling resistance of a styrene butadiene rubber compound comprising:

(a) mixing the rubber compound with a specified amount of a filler consisting essentially of a carbon black having a surface area, as measured by the nitrogen surface area method (N₂SA), of between about 5 and 350 m²/g, and a specified amount of Bis(3-triethoxysilylpropyl)-tetrasulfane to obtain a mixture;

(b) mechanically working the mixture for a period of between about 10 seconds to 20 minutes at a temperature of between about 160° C. and 180° C.;

(c) allowing the worked mixture to cool to a temperature less than the temperature at which vulcanization would occur upon addition of a predetermined masterbatch and curatives; and (d) mixing the cooled mixture with a predetermined masterbatch and curatives and mechanically working the masterbatched mixture until homogeneity is achieved.

25. The process of claim 24 wherein the Bis(3-triethoxysilylpropyl)-tetrasulfane is present in an amount of between two and five percent of the weight of carbon black for each one hundred m²/g of surface area of carbon black.

26. The process of claim 24 wherein the carbon black is selected from the group according to ASTM Recommended Practice D1765 Standard Classification System for Carbon Blacks Used in Rubber Products.

27. The process of claim 24 wherein the carbon black is present in an amount of between about 10 to 250 parts per hundred parts rubber compound.

28. The process of claim 24 wherein the mixing is accomplished via a high-shear-rate mixer.

29. A process of improving the balance of properties, including the method of increasing reinforcement and reducing rolling resistance of a rubber compound comprising the steps of:

(a) mixing a styrene butadiene rubber compound with a specified amount of a filler consisting essentially of a carbon black having a surface area, as measured by the nitrogen surface area method (N₂SA), of between about 5 and 350 m²/g, and a specified amount of Bis(3-triethoxysilylpropyl)-tetrasulfane to obtain a masterbatch;

(b) mechanically working the masterbatch for a period of between about 10 seconds to 20 minutes at a temperature of between about 160° C. and 180° C.;

(c) allowing the worked masterbatch to cool to a temperature less than the temperature at which vulcanization would occur upon addition of a predetermined masterbatch and curatives; and (d) mixing the cooled masterbatch with predetermined curatives and mechanically working the masterbatched mixture until homogeneity is achieved.

30. The process of claim 29 wherein the Bis(3-triethoxysilylpropyl)-tetrasulfane is present in an amount of between two and five percent of the weight of carbon black for each one hundred m²/g of surface area of carbon black.

31. The process of claim 29 wherein the carbon black is selected from the group according to ASTM Recommended Practice D1765 Standard Classification System for Carbon Blacks Used in Rubber Products.

32. The process of claim 29 wherein the carbon black is present in an amount of between about 10 to 250 parts per hundred parts rubber compound.

33. The process of claim 29 wherein the mixing is accomplished via a high-shear-rate mixer.

* * * * *